United States Patent Office 3,075,487
Patented Jan. 29, 1963

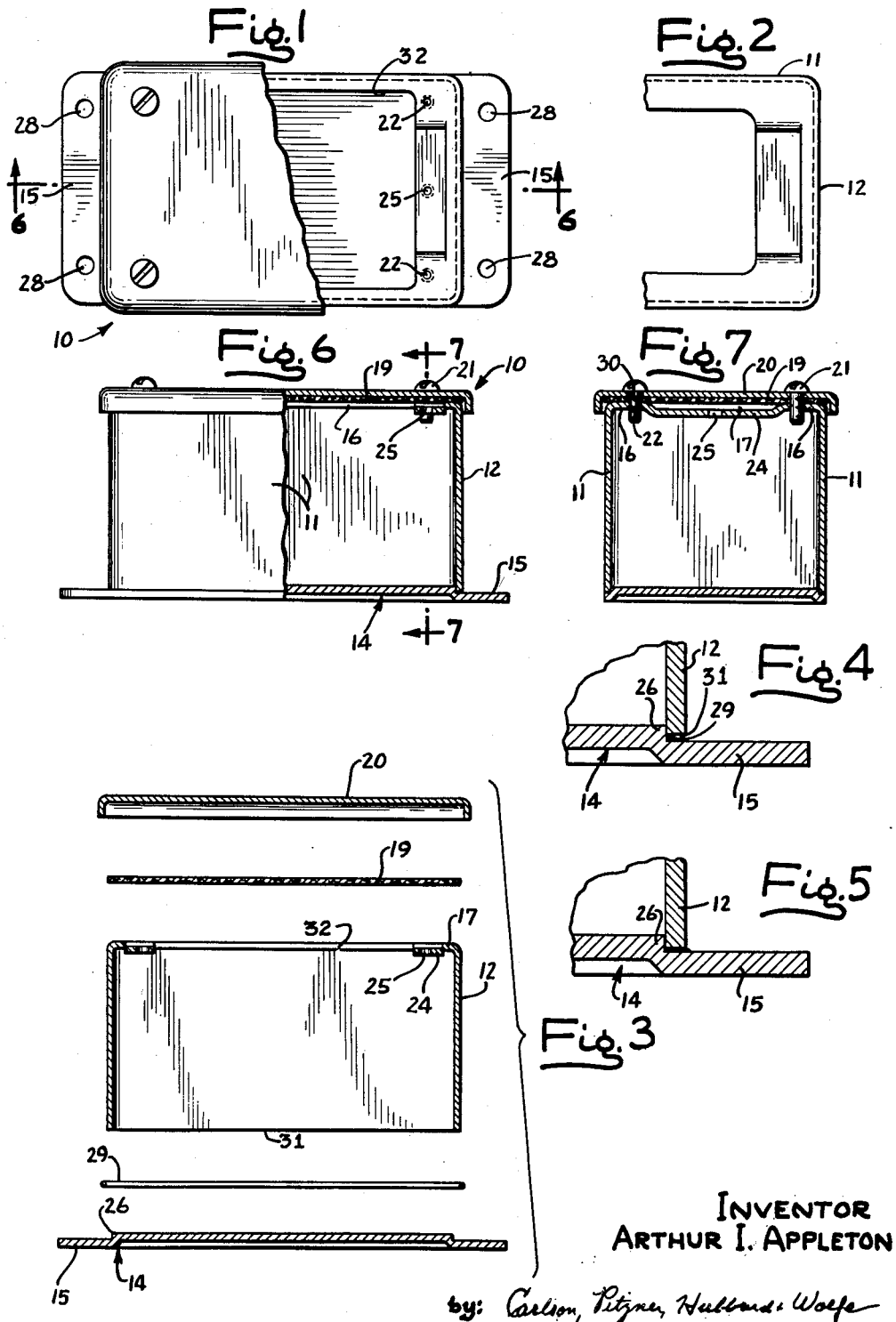

3,075,487
METHOD OF MAKING A SEALED ELECTRICAL BOX
Arthur I. Appleton, Northbrook, Ill. (% Appleton Electric Co., 1713 Wellington Ave., Chicago 13, Ill.)
Filed May 5, 1958, Ser. No. 732,862
1 Claim. (Cl. 113—120)

The present invention relates to a method for making a box of the type useful for housing electrical outlets, switches and the like. A primary object of the present invention is to make a box of the above type which can be completely sealed so as to be resistant to the penetration of moisture, explosive gases, and the like.

Another object of the present invention is to provide a novel method for making boxes of the foregoing character which involves a minimum number of steps, which is both simple and thus economical, and which can be performed rapidly and automatically.

A further object of the present invention is to produce electrical boxes of the above character which are of uniform high quality, of smoother contour, and more regular in dimension than boxes produced by present methods. At the same time it is an object to produce a box of this character which is cheaper and of improved appearance.

Still another object of the present invention is to provide a method of producing boxes which eliminates a substantial portion of the waste of metal stock and which avoids the use of welded seams for the box edges.

Other objects and advantages of the present invention will become apparent as the following description proceeds taken in connection with the accompanying drawings wherein:

FIGURE 1 is a top view of a box illustrative of the present invention and a portion of a cover thereon;

FIG. 2 is a top view of a box in an intermediate stage of formation;

FIG. 3 is an exploded sectional view of the box shown in FIG. 1 prior to assembly;

FIG. 4 is an enlarged fragmentary section view of the box as assembled but before heating to fuse the solder;

FIG. 5 is a view similar to FIG. 4 after the soldering is completed;

FIG. 6 is an elevation view, partly in section, of a box illustrative of the present invention; and FIG. 7 is a section view taken substantially in the plane of line 7—7 of FIG. 6.

In accordance with the present invention, there is formed a substantially rectangular box 10 having a pair of spaced side walls 11 and opposing end walls 12 perpendicular to the side walls. The walls are secured to a base 14 from the ends of which extend mounting flanges 15. For closing and sealing the box the upper edges of the side walls 11 and end walls 12 are formed with an inturned flange portion 16, 17 respectively, upon which is mounted a sealing gasket 19 and a cover 20. If desired, suitable apertures can be cut in one or more of the box side walls or base for the reception of electrical conduit fittings and the passage of wiring.

The cover is secured to the box by means of screw fasteners 21 extending through the cover 20 adjacent the corners thereof and engaged in corresponding threaded holes 22 in the flanges 16, 17.

For purposes of mounting a switch or the like within the box, there is provided adjacent each end wall 12 a switch mounting ear 24 extending transversely across the box between the side wall flanges 16 and offset from the end wall flanges 17. These ears are provided with one or more holes 25 for the reception of switch mounting fasteners.

The box is initially formed by the method of the present invention, in three main sections, the cover section, side and end wall structure section and the base section. These operations are carried out by stamping and deep drawing methods, deep-draw steel being one preferred material.

The base 14 is substantially rectangular in shape and is formed with an upwardly extending offset rectangular portion 26. This offset or embossed portion is set inwardly from the longitudinal edges of the base defining a marginal area of an amount at least equal to the thickness of the side and end walls of the box. The mounting flanges 15 are desirably formed by an extension of the marginal area of the base. The upwardly extending offset portion 25 is squared so that it will fit inside the box walls where it is susceptible of being fastened by soldering or brazing. In each end of the plate defining the mounting flanges suitable apertures 28 are punched for the reception of fasteners for use in mounting the completed box on a desired structure.

The portion of the box defining the side and end walls is formed from a flat piece of steel, preferably deep-draw steel. In the first step this plate is deep drawn to a generally rectangular cup-shaped rough box (not shown) having side and end walls, a closed top wall, and open at the bottom. Inasmuch as the plate from which the box is made is generally rectangular the free edges of the drawn box will be distorted and uneven. Therefore these edges are trimmed to provide a uniform cut edge 31 in one plane around the then open side of the rough box. It is this edge which will ultimately receive the base plate 14 and be secured thereto by soldering or brazing. The next step in forming the side and end wall portion of the box is to form and size the box by placing it in a die and again drawing the metal to reduce slightly the wall thickness and further shape the box metal.

In a third forming step the sides and ends are squared in a suitable die to produce a box of the configuration shown in FIG. 2. In this step a rectangular opening 32 is punched in the closed top wall of the blank thereby leaving an annular flange extending inwardly from each of the side and end walls. At the same time, the mounting ears 24 are depressed and sheared from the flanges adjacent the end walls 12. The rough blank shown in FIG. 2 is then drawn further by insertion in a die and by a drawing operation shaped to its final size. This operation serves to sharpen the corners and complete the formation of the mounting flanges.

The top hole is enlarged by punching to its final size and the flanges 16, 17 are flattened. At the same time holes 22 are punched in these flanges for the reception of the cover fastening screws 21. These holes are then tapped for the reception of a desired screw. The holes 25 in the switch mounting ears 24 are similarly punched and tapped. The side and end wall structure portion 11, 12 and the base 14 is then ready for soldering.

For attaching the end and side walls to the base, a ring of solder or brazing material 29 is placed around the offset portion of the base and the box blank is placed thereon as shown in FIG. 4. The pieces are passed through a suitable furnace where the solder is melted. The amount of solder employed is carefully calculated so thta it will flow into the space between the box walls and the base and completely fill it and at the same time allow the walls to settle towards the base, as shown in FIG. 5, thereby providing a completely sealed box. The completed box can then be enameled or otherwise finished and is ready for the reception of a cover 20.

The cover 20 is formed by punching and shaping a flat plate to define a shallow cup-like member. This cover has a downturning flange on each of its formed edges, these flanges being narrow and generally perpendicular to the cover plate. Appropriate holes 30 are drilled for the reception of fastening screws 21 and a suitable neoprene or cork gasket is secured inside the cover.

It can be easily seen by those skilled in the art that the foregoing method of producing a box has substantial advantages over the known methods wherein a box is formed by cutting out the corners of a rectangular plate, folding the remaining portions upwardly, and welding them together to form side and end walls. With the present method the welding step is completely eliminated thereby insuring that the box will have uniform and accurate dimensions. It can also be seen that there is little waste with the above described method thus making the box economical to produce as well as of uniform and pleasing appearance. When the cover is mounted in place the box is completely sealed against the entrance of moisture or explosive gases. Such boxes find particular, although not exclusive use, on machine tools and on outdoor electrical equipment.

I claim as my invention:

The method of forming a box for housing electrical devices comprising the steps of deep drawing a rectangular plate to form a rectangular box structure having mutually perpendicular integrally joined side and end walls and a top wall integrally joining said side and end walls, punching an opening in said top wall spaced from said side and end walls so as to define flanges extending inwardly from said walls, trimming the side and end walls to form a flat cut bottom edge thereon, sizing said deep drawn box to square said side and end walls with respect to each other and to reduce the corner radii therebetween, stamping a mounting bracket and bottom plate from a sheet of metal to form an upwardly embossed central area thereon having outer dimensions approximately equal to the inner peripheral dimensions of said box wall, applying a soldering material around said embossed area, placing the flat cut bottom edge of the box on the soldering material, heating said soldering material to fuse the same thereby to attach the bottom plate to the side and end box walls as a bottom end closure thereof with the embossed area projecting inside the box, stamping a cover having downwardly extending side and end flange portions, and sealingly fastening said cover to said box wall flanges.

References Cited in the file of this patent

UNITED STATES PATENTS

| | | |
|---|---|---|
| 1,448,005 | Sclater | Mar. 13, 1923 |
| 2,356,457 | Gonda | Aug. 22, 1944 |
| 2,357,754 | Moll | Sept. 5, 1944 |
| 2,454,244 | Wintermute | Nov. 16, 1948 |
| 2,479,047 | Long | Aug. 16, 1949 |
| 2,544,266 | Kennedy | Mar. 6, 1951 |
| 2,682,863 | Line | July 6, 1954 |
| 2,732,090 | Karlin | Jan. 24, 1956 |

FOREIGN PATENTS

| | | |
|---|---|---|
| 402,489 | Great Britain | Dec. 7, 1933 |
| 663,000 | Great Britain | Dec. 12, 1951 |